D. V. JAMES.
AUTOMOBILE SIGNAL.
APPLICATION FILED JUNE 11, 1915.
1,204,988.
Patented Nov. 14, 1916.
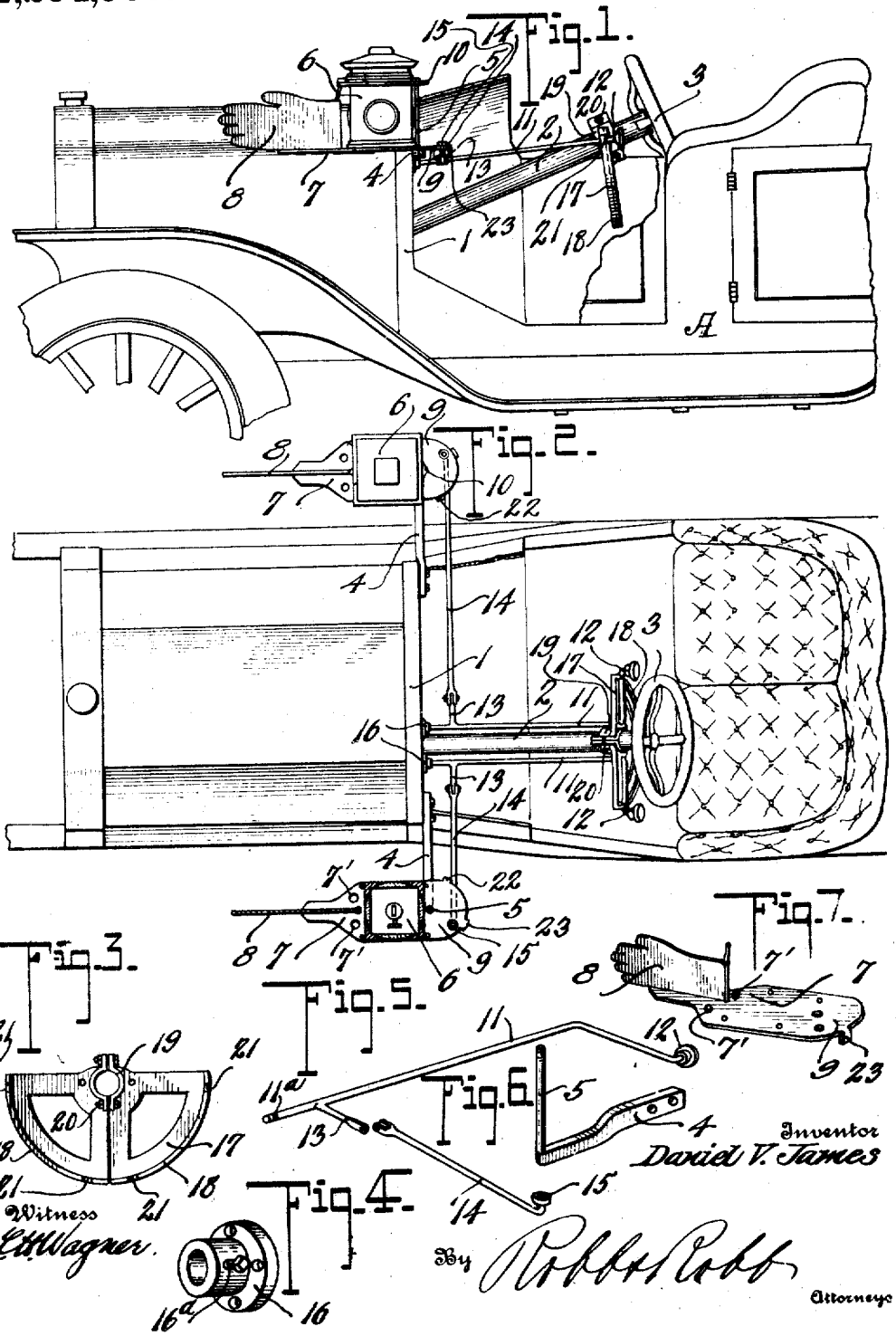

UNITED STATES PATENT OFFICE.

DANIEL V. JAMES, OF TEXARKANA, TEXAS.

AUTOMOBILE-SIGNAL.

1,204,988.

Specification of Letters Patent.

Patented Nov. 14, 1916.

Application filed June 11, 1915. Serial No. 33,532.

*To all whom it may concern:*

Be it known that I, DANIEL V. JAMES, a citizen of the United States, residing at Texarkana, in the county of Bowie and State of Texas, have invented certain new and useful Improvements in Automobile-Signals, of which the following is a specification.

The present invention comprises certain improved direction and danger signaling mechanism for automobiles particularly, though adapted to be used in connection with vehicles generally.

An especial object of the invention has been to devise a signaling mechanism including movably mounted lamps with associated direction indicators together with suitable shifting means for said device, all so constructed and combined as to be very easily applied to an ordinary motor vehicle, the operating instrumentalities being advantageously associated with and partly mounted upon the tubular steering shaft column, while the signaling means *per se* are carried by suitable brackets detachably applied to the dash-board preferably, of the machine.

With the above and other objects in view, this invention consists in the construction, combination and arrangement of parts all as hereinafter more fully described, claimed and illustrated in the accompanying drawings, wherein:

Figure 1 is a side view, partly broken away, of an automobile equipped with the signaling means embodying the invention. Fig. 2 is a plan view of the same, one of the signal lights being shown in section. Fig. 3 is a detail view of the sectional sector coöperative with the shifting members to hold the same in predetermined adjustments. Fig. 4 is a detail view of one of the dash-board bearings for the shifting members. Fig. 5 is a detail view of one of the shifting members and its connecting rod. Fig. 6 is a detail perspective view of a preferred form of supporting bracket for the lamp. Fig. 7 is a detail perspective view showing more clearly the direction indicator.

Throughout the following detail description, and on the several figures of the drawings, similar parts are referred to by like reference characters.

Specifically describing the invention as illustrated in the drawings, A denotes the body of an ordinary automobile having the usual dash-board 1, steering column 2, and steering wheel 3. Secured detachably to the dash-board 1 in a well known manner, are supporting brackets 4 on which are pivotally mounted by means of journal members 5 of the brackets 4, the lamps or headlights 6. It is contemplated that these lamps 6 shall be provided with suitable windows, or colored lens closed openings at the sides and back of each lamp, the front window having a clear lens or glass closing the same so that a white light will be thrown forward as usual, as distinguished from the red rays projected from the sides and the green rays projected from the back owing to the particular coloring of the said lens. Each lamp is provided at its front portion with an extension 7 upon which is mounted in any suitable rigid manner an indicator 8, shaped like a hand. In a somewhat similar manner, each lamp 6 has a rearward extension 9, at its bottom portion, and an extension 10 of lesser size at its upper portion through which the journal member 5 of the bracket 4 passes to afford the pivotal mounting of the lamp on the bracket.

Having in view the foregoing, it will be apparent that owing to the mounting of the lamps 6, these lamps are susceptible of being turned on the brackets 4 so that they occupy the normal position shown in Figs. 1 and 2 with the indicators 8 extending forward, or they may be moved to a position extending laterally from the vehicle, especially for the purposes of indicating the direction in which the operator of the machine intends to turn, or to perform the function of a danger signal in other words.

The operating means used to adjust the positions of the lamps 6 comprises shifting members or operating shafts 11, one provided for each lamp. Each shifting member consists of a shaft formed with a crank handle 12 at its rear end and with an operating crank 13 intermediate its ends. The crank 13 is connected by a rod 14 with the rearward extension 9 of the associated lamp and fastened by means of a nut 15 to said extension. The shaft of each shifting member 11 has its forward end mounted in a bearing 16 detachably secured to the dash-board 1, the rear end portion of the shifting member passing through a sector 17 mounted on the steering column 2 and formed with a flange 18 at its curved edge portion. The sector 17, for facilitating the ready application of the invention to present types of machines is made of two sections formed with clamping flanges 19 adapted to engage and embrace the steering column 2 and having clamping bolts or fastenings 20 passing therethrough to securely hold the sections and the sector as a whole at a predetermined point in the length of the steering column, a point which is adjacent to the steering wheel 3. The crank handles 12 of the shifting members 11 operate on the rear side of the sector 17, and said sector is provided with four notches 21, two of which notches coöperate with each handle 12.

Having described the general construction of the various instrumentalities making up the signaling means of the invention, the operation of the same will now be set forth.

Assuming that the parts are in the position shown in Figs. 1 and 2, with the handles 12 adjusted to engage the uppermost notches 21 of the sector 17, should the operator intend to drive his machine to the right, he will pull downwardly upon the right hand handle 12 of the shifting member at the right side of the steering column 2 moving said handle 12 until it engages through the inherent resilient action of the same with the coöperative lowermost notch of the sector 12. This action turns the shaft of the right hand shifting member 11, exerts a pull on the connecting rod 14 leading to the right hand lamp 6 and shifts said lamp into a position approximately 90° until the indicator 8 for the same projects at right angles to the machine. Obviously the positioning of the indicator 8 in the above manner will signal anyone in the rear or occupying any position, in fact, in reference to the machine of the intention of the operator to steer to the right, and after the machine has been turned as desired, a simple upward shove on the adjusting handle 12 will restore the indicator 8 and the lamp 6 carrying the same to the normal position.

The signaling means above referred to is very effective at night, in that the light rays of the lamp 6 are projected forward upon the indicator 8, and, therefore, the latter will be plainly seen. In addition to this the turning of the lamp itself by means of the devices described will position the lamp so that the danger signaling red light rays will be projected forward and rearward until the lamp is restored to its normal position. The mechanism, of course, may be used under any established rules or regulations governing the signaling operations necessary on the part of operators of motor vehicles.

It may be noted that the extension 7 of each lamp is provided with openings 7' so that currents of air directed against the front of the lamp will pass through the openings 7' and not create upon the indicator 8, which is of light metal construction, undue pressure in either direction. Likewise to limit the movement of each lamp and also to assist in preventing undue vibration when the lamp is either in normal or signaling position, it is contemplated to provide stops 22 and 23 projecting downward from the rear extension 9. When the lamps are in the position shown in Fig. 2, each stop 22 is in engagement with the rod 14, whereby the inward movement of the lamp is limited. Each stop 23 will coöperate with the adjacent rod 14 when the shifting member 11 for said lamp is operated to move the lamp into a position in which the indicator 8 projects upwardly from the machine.

As a convenient means for holding the shifting members 11 from displacement, the forward extremities of the shafts of each shifting member 11 may be annularly grooved as at 11ª and stops in the form of set screws 16ª mounted on each bearing member 16 so that the end of the stop engages in the groove 11ª of the associated member 11 thus firmly connecting the parts 11 and 16 but freely permitting the movement of the former.

Having thus described my invention, what I claim as new is:

In combination with a motor vehicle embodying steering means including a steering column and a dash-board, signaling means comprising a sector detachably secured to the steering column, operating shafts adjacent to said steering column, crank handles at corresponding ends of said shafts adapted to interlock with the sector to hold the shafts in predetermined positions, bearings in the dash-board receiving the other ends of the shafts, cranks projecting laterally from the shafts intermediate their ends, indicators at opposite sides of the machine, means pivotally supporting said indicators, connecting rods intermediate the indicators and the said cranks whereby movement of the shafts will shift the indicators to normal or signaling positions as desired, each indicator comprising a lamp and an indicating element projecting therefrom, and stops carried by each indicator and adapted to engage the adjacent connecting rod whereby to limit the movement of the indicator in opposite directions.

In testimony whereof I affix my signature.

DANIEL V. JAMES.